United States Patent
Park et al.

(10) Patent No.: US 8,780,229 B2
(45) Date of Patent: Jul. 15, 2014

(54) IMAGE PHOTOGRAPHING APPARATUS AND METHOD OF CONTROLLING THE SAME

(75) Inventors: Wan Je Park, Seongnam-si (KR); Jung Ah Seung, Suwon-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 286 days.

(21) Appl. No.: 12/817,632

(22) Filed: Jun. 17, 2010

(65) Prior Publication Data

US 2010/0321533 A1    Dec. 23, 2010

(30) Foreign Application Priority Data

Jun. 23, 2009 (KR) .................. 10-2009-0056162

(51) Int. Cl.
*H04N 5/262* (2006.01)

(52) U.S. Cl.
USPC ........................................ 348/239

(58) Field of Classification Search
USPC .................................... 348/220.1
See application file for complete search history.

(56) References Cited

U.S. PATENT DOCUMENTS

| | | | |
|---|---|---|---|
| 4,829,384 A * | 5/1989 | Iida et al. | 348/64 |
| 7,084,919 B2 * | 8/2006 | Shibata et al. | 348/333.06 |
| 7,388,605 B2 * | 6/2008 | Obrador | 348/220.1 |
| 7,394,485 B2 * | 7/2008 | Kim | 348/220.1 |
| 2004/0105012 A1 * | 6/2004 | Lee | 348/220.1 |
| 2007/0040810 A1 * | 2/2007 | Dowe et al. | 345/173 |
| 2009/0129672 A1 * | 5/2009 | Camp et al. | 382/173 |
| 2009/0141138 A1 * | 6/2009 | DeAngelis | 348/220.1 |
| 2010/0115405 A1 * | 5/2010 | Chang et al. | 715/702 |
| 2010/0188579 A1 * | 7/2010 | Friedman | 348/565 |
| 2012/0092494 A1 * | 4/2012 | Garoutte et al. | 348/143 |

FOREIGN PATENT DOCUMENTS

KR    20070088789    8/2007

* cited by examiner

*Primary Examiner* — James Hannett
(74) *Attorney, Agent, or Firm* — Stanzione & Kim, LLP

(57) ABSTRACT

An image photographing apparatus simultaneously photographs a moving image and a still image in a simultaneous photographing mode, recognizes a still image photographed at a time point closest to a photographing time point of the moving image output at a time point when the specific region is specified when a user specifies the specific region of the moving image screen while reproducing the moving image photographed in the simultaneous photographing mode, and magnifies and displays a region corresponding to the specific region on the recognized still image.

64 Claims, 21 Drawing Sheets

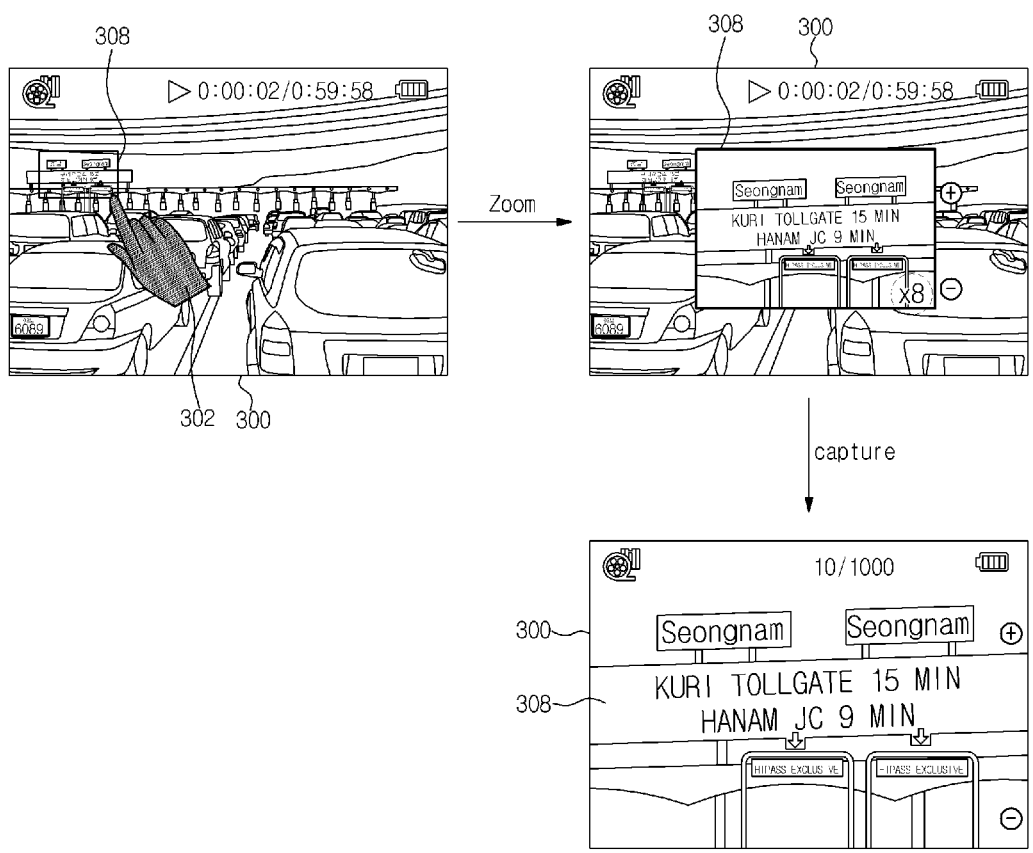

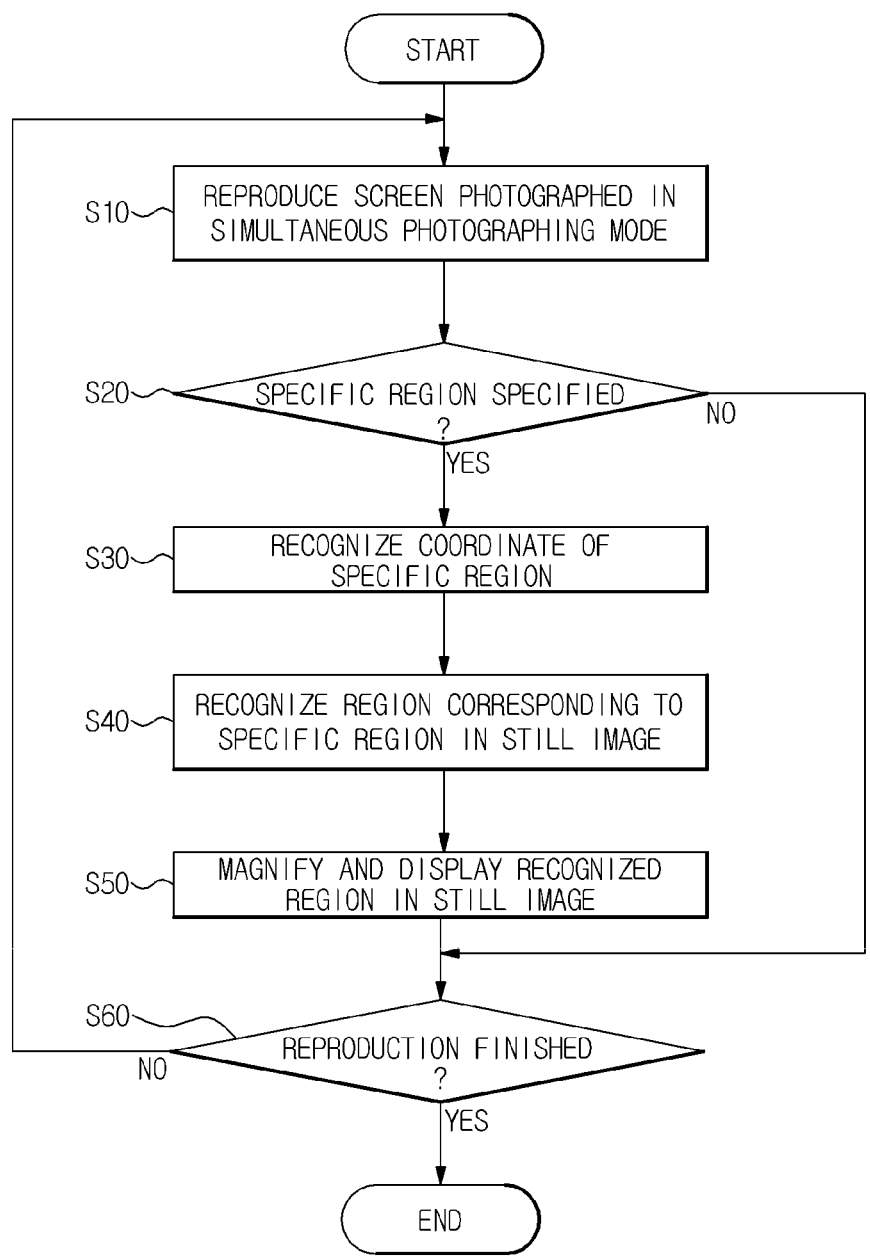

IMAGE PHOTOGRAPHING APPARATUS AND METHOD OF CONTROLLING THE SAME

CROSS-REFERENCE TO RELATED APPLICATIONS

This application claims priority under 35 U.S.C. §119 of Korean Patent Application No. 2009-0056162, filed on Jun. 23, 2009 in the Korean Intellectual Property Office, the disclosure of which is incorporated herein by reference in its entirety.

BACKGROUND

1. Field of the Invention

Embodiments of the present general inventive concept relate to an image photographing apparatus to magnify and display a specific region of a moving image screen, and a method of controlling the same.

2. Description of the Related Art

Generally, a digital camera converts an image input through a lens into a digital signal and stores the digital signal in a recording medium such as a hard disk or a memory card. Such a digital camera is mainly used to photograph a still image, in consideration of the capacity of the recording medium to record an image. Some digital cameras have a function to photograph a moving image, but may be incapable of photographing a moving image for a long time. In order to photograph a moving image for a long time, camcorders which are recording and reproducing devices to record and reproduce the image and the voice of a subject to be photographed in and from a recording medium such as a tape have come into wide use.

In a camcorder, a magnetic tape is employed as a recording medium, and the magnetic tape is mounted in a deck device such that a moving image to be photographed is recorded therein. Such a camcorder may photograph a moving image for one hour or more. In addition, the camcorder has a function to photograph a still image. However, since the image quality of the camcorder is inferior to that of a digital camera, the camcorder is mainly used to photograph a moving image.

SUMMARY

Therefore, it is an aspect of the present general inventive concept to provide an image photographing apparatus to magnify and display a still image in a specific region of a moving image screen when the specific region is specified, and a method of controlling the same.

Additional aspects of the general inventive concept will be set forth in part in the description which follows and, in part, will be obvious from the description, or may be learned by practice of the general inventive concept.

Features and/or utilities of the present general inventive concept may be realized by a method of controlling an image photographing apparatus to photograph a still image while photographing a moving image including determining whether a specific region of a moving image screen is specified, and searching for a still image of the specific region and displaying the still image on the screen, when the specific region is specified.

The photographing of the still image while photographing the moving image may include periodically photographing the still image while photographing the moving image.

The photographing period of the still image while photographing the moving image may be manually adjusted.

A time when the still image is photographed while photographing the moving image may be recorded as tag information.

When the still image is photographed while photographing the moving image, a mark may be put on a portion of moving image data streams corresponding to a time when the still image is photographed, such that time information is recorded.

The displayed still image may be continuously changed to still images of the specific region photographed.

The specific region of the moving image screen may be specified by dragging a cursor over the specific region.

The coordinate of a drag start point and the coordinate of a drag end point may be recognized on the moving image screen so as to recognize the coordinate region of the specific region.

The searching of the still image of the specific region may include searching for the still image photographed at a time point closest to a photographing time point of the moving image reproduced at a time point when the specific region is specified.

If still images are photographed with the same time difference before and after the photographing time point of the moving image reproduced at the time point when the specific region is specified, a still image selected by a predetermined pattern from the still images photographed before and after the photographing time point of the moving image reproduced at the time point when the specific region is specified may be searched for.

If still images are photographed with the same time difference before and after the photographing time point of the moving image reproduced at the time point when the specific region is specified, a still image randomly selected from the still images photographed before and after the moving image reproduced at the time point when the specific region is specified is photographed may be searched for.

The searching of the still image of the specific region may include recognizing the coordinate region of the specific region in the moving image screen and searching for the coordinate region in the still image corresponding to the recognized coordinate region.

The displaying of the searched still image may include magnifying and displaying the still image of the specific region with a ratio inversely proportional to the size of the specific region on the moving image screen.

The displaying of the searched still image may include magnifying and displaying the still image of the specific region with any one of a plurality of selectable sizes.

When the searched still image is displayed, the displayed still image may be dragged to be moved.

When the searched still image is displayed, a key input unit or a display panel may be operated such that the displayed still image is captured.

Features and/or utilities of the present general inventive concept may also be realized by an image photographing apparatus to photograph a still image while photographing a moving image, the image photographing apparatus including a display unit to output the moving image and a control unit to search for a still image of a specific region and display the still image on the display unit when the specific region of a moving image screen is specified.

The image photographing apparatus may further include a first camera unit to photograph the moving image and a second camera unit to photograph the still image.

The first camera unit may include a first lens to capture an external image, a first image sensor to convert the moving image input through the first lens into an electrical signal, and a first driver to drive the first image sensor.

The second camera unit may include a second lens to capture an external image, a second image sensor to convert the still image input through the second lens into an electrical signal, and a second driver to drive the second image sensor.

The image photographing apparatus may further include a mode selection switch to select any one of a moving image photographing mode to photograph a moving image, a still image photographing mode to photograph a still image and a simultaneous photographing mode to photograph both a moving image and a still image.

The control unit may check the photographing mode of the image photographing apparatus and periodically photograph the still image while photographing the moving image if the photographing mode is the simultaneous photographing mode.

A time when the still image is photographed while photographing the moving image may be recorded as tag information.

The control unit may put a mark on a portion of moving image data streams corresponding to a time when the still image is photographed while photographing the moving image, such that time information is recorded.

The control unit may control the display unit to continuously display the periodically photographed still image.

The control unit may search for a still image photographed at a time point closest to a photographing time point of the moving image reproduced at a time point when the specific region is specified.

If still images are photographed with the same time difference before and after the photographing time point of the moving image reproduced at the time point when the specific region is specified, a still image selected by a predetermined pattern from the still images photographed before and after the photographing time point of the moving image reproduced at the time point when the specific region is specified may be searched for.

If still images are photographed with the same time difference before and after the photographing time point of the moving image reproduced at the time point when the specific region is specified, a still image randomly selected from the still images photographed before and after the photographing time point of the moving image reproduced at the time point when the specific region is specified may be searched for.

The control unit may recognize the coordinate region of the specific region in the moving image screen and search for the coordinate region in the still image corresponding to the recognized coordinate region.

Features and/or utilities of the present general inventive concept may also be realized by a method of capturing a still image and a video image, the method including continuously displaying a video image, sensing a selected portion of the video image, and capturing a still image of the selected portion.

Features and/or utilities of the present general inventive concept may also be realized by a method of capturing a still image and a video image, the method including receiving a user input selecting a portion of a video image and capturing a still image corresponding to the selected portion of the video image.

Features and/or utilities of the present general inventive concept may also be realized by a method of capturing a still image and a video image, the method including capturing a video image, receiving an input to capture a still image of a selected portion of the video image, and capturing a still image of the selected portion of the video image.

The method may further include recognizing a selected object in the selected portion of the video image.

The method may further include, when the selected object moves from the selected portion of the video image, adjusting at least one of a size and a location of the selected portion to include the selected object.

Recognizing the selected object may include recognizing at least one of a size, shape, profile, mass, and type of the selected object.

Receiving an input may include sensing a user input to select a first point on a screen displaying the video image and sensing a user input to drag a selection icon from the first point to a second point on the screen to define the selected portion.

Capturing the still image may include capturing still images at regular intervals of time. The still image may be captured with a higher resolution than the video image.

The method may further include displaying the still image on a display.

The still image may be displayed on a same screen as the video image. Alternatively, the still image may be displayed on a different screen as the video image.

The still image may be displayed on only a portion of the screen so as to continue displaying the video image on the screen.

The still image may be displayed for only a predetermined period of time. The still image may be magnified on the display.

The method may further include marking a data feed corresponding to the captured video image when the still image is captured.

Marking the data feed may include generating a visual object on the video image at a point in the data feed where the still image is captured.

The still image may be captured simultaneously with the capture of the video image.

Features and/or utilities of the present general inventive concept may also be realized by a method of capturing a still image and a video image, the method including capturing a video image, regularly capturing still images corresponding to a selected portion of the video image, sensing an input to display one of the still images, and displaying one of the still images.

Displaying the still image may include determining whether a captured still image exists that is captured at a time closest to a time that the input was sensed, and, if it is determined that a captured still image exists that was captured at a time closest to a time that the input was sensed, displaying the captured still image.

Alternatively, if it is determined that two still images exist that were captured at times equidistant from the time that the input was sensed, the method may include displaying one of the two still images.

Displaying one of the two still images may include selecting at random one of the two still images to display.

Features and/or utilities of the present general inventive concept may also be realized by an image-capture apparatus, including an image-capture unit to capture a video image and a still image and a controller to cause the image-capture unit to capture the still image corresponding to a selected portion of the video image.

The image-capture apparatus may include a display to display the video image.

Each of the video image and the still image may be displayed on the display. The display may include at least a first display to display the video image and a second display to display the still image.

The image-capture unit may include an input unit to receive an input to select the selected portion of the video image.

The input unit may be a display to display the video image.

The input unit may include at least one of a button, a knob, a dial, and a touch-pad, and a touch screen.

Each of the video image and the still image may be displayed on the display.

The image-capture unit may include a first camera to capture the video image and a second camera to capture the still image.

The second camera may have a higher resolution than the first camera.

The image-capture apparatus may include a data storage unit to store at least one of the video image and the still image.

The controller may determine a first time at which the portion of the video image is selected and may display a stored still image corresponding to a time closest to the first time.

The controller may cause the image-capture unit to capture the still image simultaneously with the capture of the video image.

Features and/or utilities of the present general inventive concept may also be realized by a computer-readable medium having stored thereon executable code to execute a method, the method including capturing a video image, receiving an input to capture a still image of a selected portion of the video image, and capturing a still image of the selected portion of the video image.

BRIEF DESCRIPTION OF THE DRAWINGS

These and/or other aspects of the general inventive concept will become apparent and more readily appreciated from the following description of the embodiments, taken in conjunction with the accompanying drawings of which:

FIG. 9 is a view illustrating a process of magnifying and capturing a specific region of a moving image screen of the image photographing apparatus according to an embodiment of the present general inventive concept;

FIG. 11 is a flowchart illustrating a method of controlling an image photographing apparatus according to an embodiment of the present general inventive concept.

DETAILED DESCRIPTION OF THE EMBODIMENTS

Figure 1:
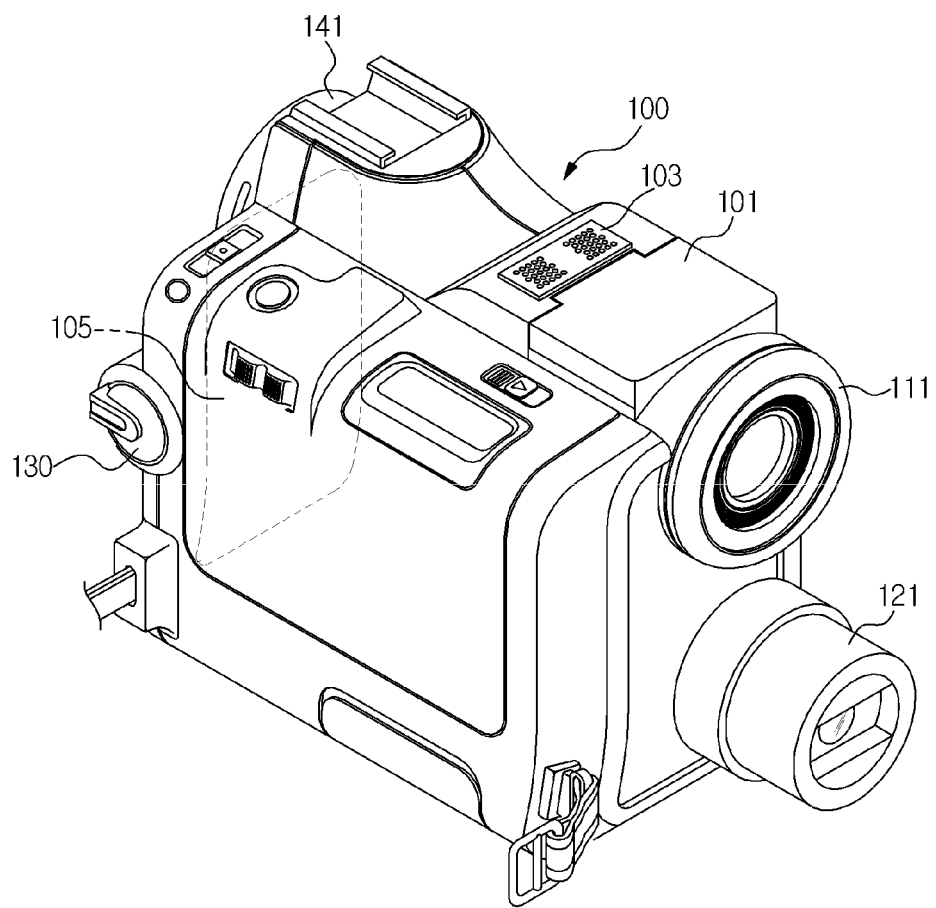
FIG. 1 is a schematic perspective view of an image photographing apparatus according to an embodiment of the present general inventive concept.

Reference will now be made in detail to the embodiments of the present general inventive concept, examples of which are illustrated in the accompanying drawings, wherein like reference numerals refer to like elements throughout.

FIG. 1 is a schematic perspective view of an image photographing apparatus according to an embodiment of the present general inventive concept, and FIG. 2 is a control block diagram of the image photographing apparatus according to the embodiment of the present general inventive concept.

The image photographing apparatus includes a main body 100, a first camera unit 110, a second camera unit 120, a mode selection switch 130, a display unit 140, and a control unit 150.

A storage device having a function to attach or detach a storage medium to record a moving image or a still image is provided in the main body 100. Any medium to record digital data, such as a hard disk, a memory stick, a Digital Versatile Disk (DVD), or a cassette tape, may be used as the storage medium. The storage device is formed such that the storage medium is attached to or detached from the main body according to the selected storage medium. Using a cassette tape as an example, a deck door to insert the cassette tape 102 may be openably and closably provided on one side surface of the main body 100. Such a deck door opens the lower side of the main body 100 so as to allow the cassette tape 102 to be mounted in a moving deck. In addition, a flash memory may be used as the storage medium to store a still image, and a flash memory mounting unit to attach and detach the flash memory may be provided in the main body 100.

Alternatively, any one of, or any combination of, the above-described storage media may be used to capture video images and still images, respectively. For example, the flash memory may store both the video and still images, a DVD may be used to store the video images and a hard disk may be used to store the still images, etc.

A flash 101 is provided on the upper surface of the main body 100, and a microphone unit 103 to acquire external sound is provided on the rear side of the flash 101. A battery mounting unit 105 is provided on the rear surface of the main body 100 to receive a battery to supply power to operate the image processing apparatus. The battery may be attached to and detached from the battery mounting unit 105.

A first camera unit 110 may be a camcorder to photograph a moving image. According to an embodiment of the present general inventive concept, a digital video camera may be used as the first camera unit 110. The first camera unit 110 includes a first lens 111 of the first camera unit 110 to capture an external image, a first image sensor 112 to convert a moving image input through the first lens 111 into an electrical signal, and a first driver 113 to drive the first image sensor 112. The first lens 111 is provided on the front surface of the main body 100, and the flash 101 is provided above the first lens 111. At this time, a Charged Coupled Device (CCD) is generally used as the first image sensor 112, and the number of pixels thereof is less than that of a second image sensor 122 (described later) so as to correspond to the lens of the digital video camera.

A second camera unit 120 may correspond to a Digital Still Camera (DSC) to photograph a still image, and includes a second lens 121 which is a lens for the DSC, a second image sensor 122 to convert a still image photographed through the second lens 121 into an electrical signal, and a second driver 123 to drive the second image sensor 122. At this time, the second lens 121 is preferably provided on the same plane as the first lens 111. A CCD is generally used as the second image sensor 122, and the number of pixels is greater than that of the first image sensor 112 so as to correspond to the lens for the DSC. In addition, the driving of the second driver 123 of the second camera unit 120 is controlled by the control unit 150.

The first camera unit 110 and the second camera unit 120 may be mounted in the same device, or within a shell or housing of the same main body 110. Alternatively, one of the first and second camera units 110, 120 may be electrically connected to the main body 100, but detachable from the main body 100. For example, the first camera unit 110 may be a video camera unit designed to be inside and integral with a main body 100. The second camera unit 120 may be a still camera that may be connected to the main body 100 via a communication port, such as a USB port, wireless transceiver, or other communication port.

A mode selection switch 130 may be provided on one side of the main body 110, and is used to select any one of a moving image photographing mode to photograph a moving image by the first camera unit 110, a still image photographing mode to photograph a still image by the second camera unit 120, and a simultaneous photographing mode to photograph a still image by the second camera 120 while photographing a moving image by the first camera unit 110.

The display unit 140 displays images photographed by the first camera unit 110 and the second camera unit 120, and includes a viewfinder 141 provided on the rear end of the main body 100 and a display panel 142 that may be provided on one side of the main body 100. A liquid crystal display (LCD) device is generally used as the display panel 142. In addition, the display panel 142 may include a touch screen to recognize the touch of a user.

The control unit 150 determines a photographing mode according to the signal transmitted from the mode selection switch 130 and drives the camera units 110 and 120 corresponding to the selected photographing mode. That is, the first camera unit 110 is driven if the mode selection switch 130 is set to the moving image mode, the second camera unit 120 is driven if the mode selection switch 130 is set to the still image mode, and both the first camera unit 110 and the second camera unit 120 are driven if the mode selection switch 130 is set to the simultaneous photographing mode. Predetermined control data is input to the control unit 150 through a key input unit 106.

The control unit 150 controls a first image processing unit 160 and a second image processing unit 164 according to the photographing mode selected by the mode selection switch 130. The first image processing unit 160 processes the moving image photographed by the first camera unit 110, processes an input moving image signal, stores the processed signal in a moving image storage medium, such as a cassette tape, and compresses the signal into a signal for display by the display unit 140. The second image processing unit 164 processes the still image photographed by the second camera unit 120, stores the processed still image in a still image storage medium such as the flash memory 104, and compresses the image into a signal for display by the display unit 140.

The control unit 150 controls the first camera unit 110 to photograph a moving image and controls the second camera unit 120 to periodically photograph a still image, when the simultaneous photographing mode is selected. The photographing period of the still image may be manually adjusted. For example, the photographing period may be adjusted by the key input unit 106 such that a still image is photographed by the second camera unit 120 once per 1 second. If the photographing period is not manually adjusted by the user, the photographing period may be set to a default value.

If the simultaneous photographing mode is selected, the control unit 150 records a time when a still image is photographed by the second camera unit 120 while photographing the moving image by the first camera unit 110, as tag information. That is, when the still image is photographed while the moving image is photographed, a mark is put on a portion of moving image data streams corresponding to a time when the still image is photographed and time information is recorded. In detail, compression is performed with respect to every screen when the moving image is recorded, and the control unit 150 may configure the data of one compressed screen by moving image data streams so as to record the data on a recording medium. At this time, the control unit 150 may put a mark on image data of one screen corresponding to an instant when the still image is photographed. The mark is put in a header of the image data and placing the mark may consist of setting a specific bit of the header to a logic value "1" or "0".

When a user specifies a specific region of a moving image screen while reproducing a moving image photographed in the simultaneous photographing mode, the control unit 150 may magnify and display a still image in the specific region. The specific region may be specified when the user drags a portion of the display unit 140. When the portion of the moving image screen is dragged (in a diagonal direction), the coordinate (x1, y1) of a drag start point and the coordinate (x2, x2) of a drag end point are recognized. If the specific region is specified by the above method, the coordinate region of the still image corresponding to the coordinate region of the specific region is searched for and magnified.

When the user specifies the specific region of the moving image screen while reproducing the moving image photographed in the simultaneous photographing mode, the control unit 150 magnifies and displays a still image photographed at a time point closest to a photographing time point of the moving image reproduced at a time point when the specific region is specified. If still images are photographed with the same time difference before and after the photographing time point of the moving image reproduced at the time point when the specific region is specified, a still image randomly selected from the still images photographed before and after the photographing time point may be magnified and displayed or a still image selected by a predetermined pattern (e.g., a still image which is previously photographed) may be magnified and displayed.

When the user specifies the specific region of the moving image screen while reproducing the moving image photographed in the simultaneous photographing mode, the control unit 150 may magnify and display a still image photographed at a time point closest to a photographing time point of the moving image reproduced at a time point when the specific region is specified. At this time, the magnified and displayed still image in the specific region may be set to be continuously changed to still images of the specific region photographed thereafter. That is, when the user specifies the specific region of the moving image screen while reproducing the moving image photographed in the simultaneous photographing mode, the still image photographed at a time point closest to a photographing time point of the moving image reproduced at a time point when the specific region is specified may be magnified and displayed, and the still images photographed after the time point when the magnified and displayed still image is photographed may be continuously magnified and displayed, such that the magnified still images may be continuously changed according to the change of the moving image.

When the user specifies the specific region of the moving image screen while reproducing the moving image photographed in the simultaneous photographing mode, the control unit 150 may set a magnification ratio of the specific region to be inversely proportional to the size of the specific region specified by the user. For example, the magnification ratio may be set to "5× (five times)" when the user specifies a specific region that is 10% of the size of the reproduction screen and may be set to "2× (twice)" when the user specifies a specific region that is 25% of the size of the reproduction screen. That is, if the range which is dragged by the user in order to specify the specific region of the moving image screen is small, the magnification ratio is large and, if the dragged range is large, the magnification ratio is small.

Figure 2A:
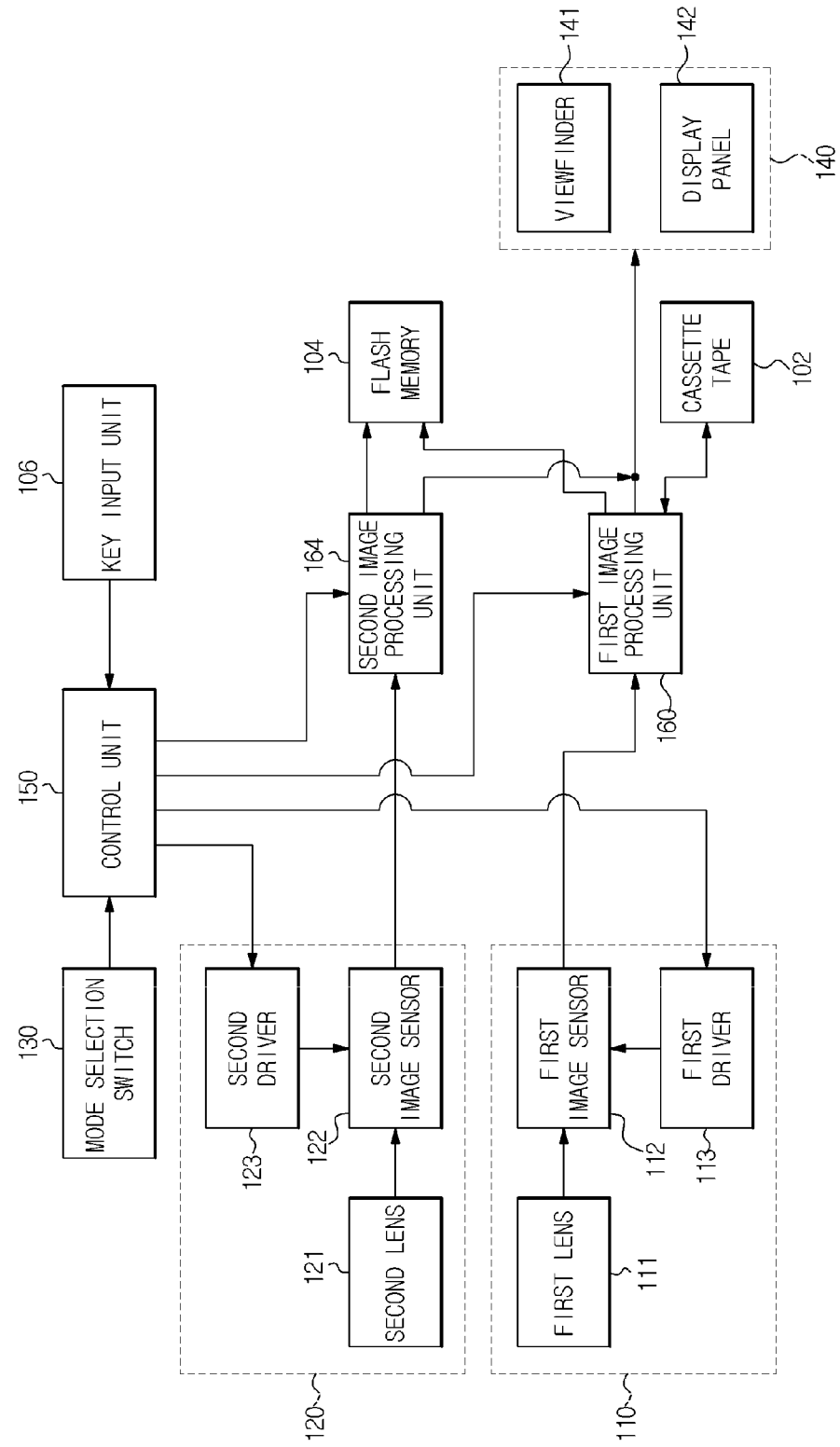
FIG. 2A is a control block diagram of the image photographing apparatus according to an embodiment of the present general inventive concept.
Figure 2B:
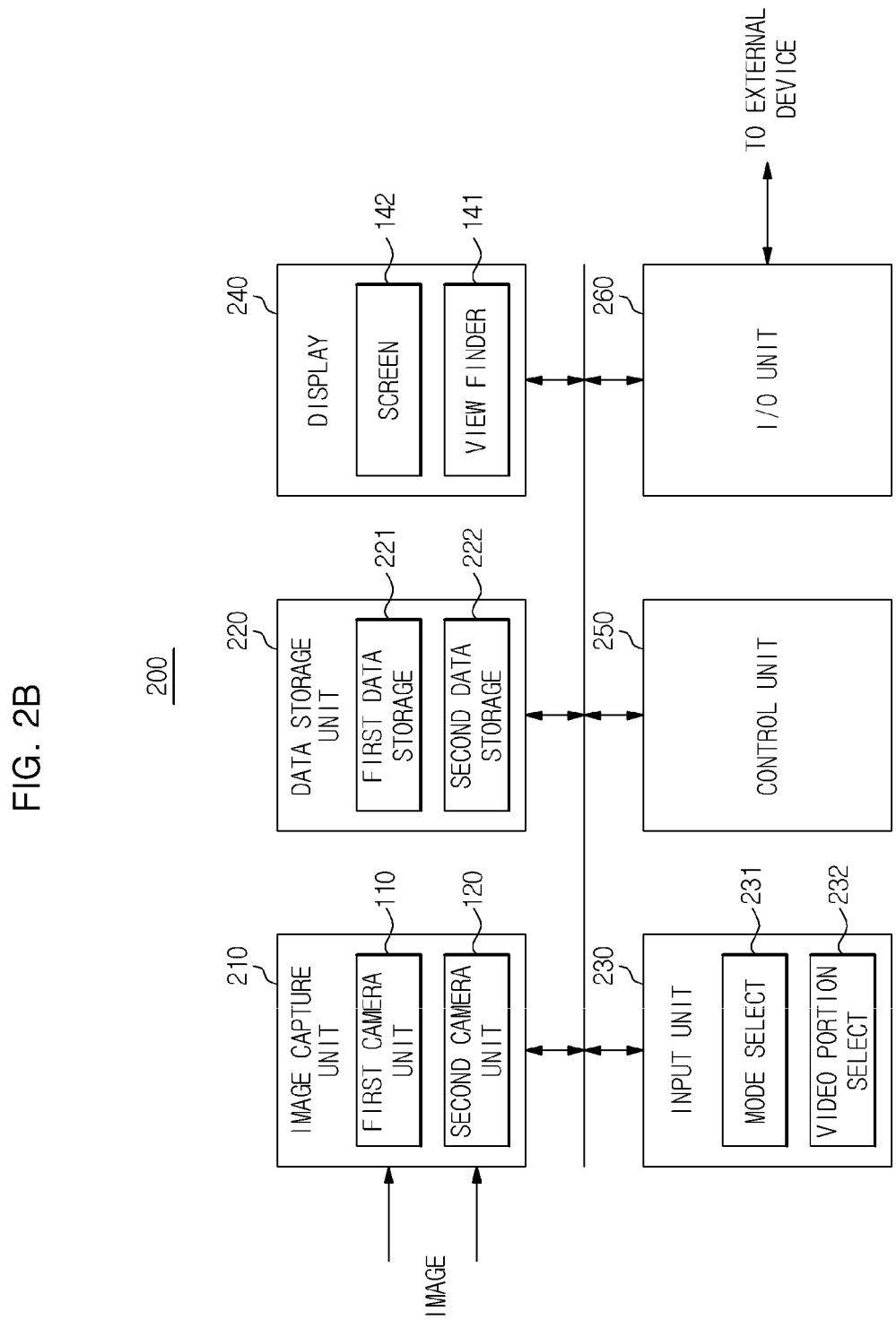
FIG. 2B is a control block diagram of an image photographing apparatus according to another embodiment of the present general inventive concept.

FIG. 2B illustrates an block diagram of an image capture apparatus 200 similar to FIG. 2A, according to another embodiment. In the image capture apparatus 200, a first image capture unit 210 may include the first camera unit 110 and second camera unit 120. The first and second camera units 110, 120 may be any combination of video and still image-capture cameras. Alternatively, the image capture unit 210 may include only one camera unit, such as a video camera unit. As described above, the video and still cameras may include digital, tape, and film cameras, or any other type of image-capture device. A data storage unit 220 may receive and store data from the image capture unit 210. For example, the data storage unit 220 may store video images and still images. The data storage unit 220 may include multiple data storage units and different types of data storage. For example, the data storage unit 220 may include a first data storage 221 to store video images and a second data storage 222 to store still images. Different types of image-storing media are discussed above with respect to FIG. 2A.

An input unit 230 may include various inputs including a mode select input 231 and a video portion select input 232. For example, the mode select input 231 and the video portion select input 232 may include a knob, a dial, a button, or a touch-screen. A display 240 may display one or both of the video and still images, and any other user interface or data. The display 240 may include one or more displays, such as a screen 142 and a viewfinder 141. For example, a video may be displayed in the viewfinder 141 while a still image or graphic is displayed on the screen 142.

A controller or control unit 250 may control operation of any of the image capture unit 210, data storage unit 220, input unit 230, and the display 240. The control unit 250 may include one or more processing units, logic units, and memory. For example, as illustrated in FIG. 2A, the control unit 250 may include first and second image processing units 160 and 164 corresponding to the different image-capture units 110 and 120. The one or more processors of the control unit 250 may be dedicated to certain data or image devices or units, or various functional units may share a single processor and supporting logic.

An I/O unit 260 may connect to an external device, and may transmit data to and from the image-capture device 200. The I/O unit 260 may include one or more ports including wired and wireless ports to transmit data.

While FIG. 2B illustrates a data bus connecting the functional units, any of the functional units may be directly connected to one another on an exclusive data line or bus. For example, the image capture unit 210 may be directly connected to the data storage unit 220, and the control unit 250 may be connected to each to control the storage of data from the image capture unit 210 to the data storage unit 220.

Embodiments of the present general inventive concept may be applicable to an image photographing apparatus to drive the two camera units so as to simultaneously photograph a moving image and a still image and an image photographing apparatus to drive one camera unit so as to photograph a still image while a moving image is photographed.

Figure 3A:
FIGS. 3A to 3C are views illustrating a process of magnifying a specific region of a moving image screen of the image photographing apparatus according to an embodiment of the present general inventive concept.
Figure 3B:
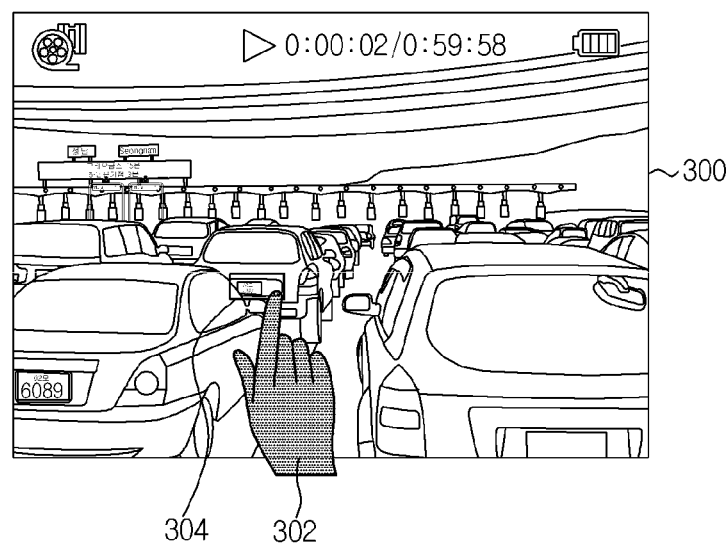
Figure 3C:
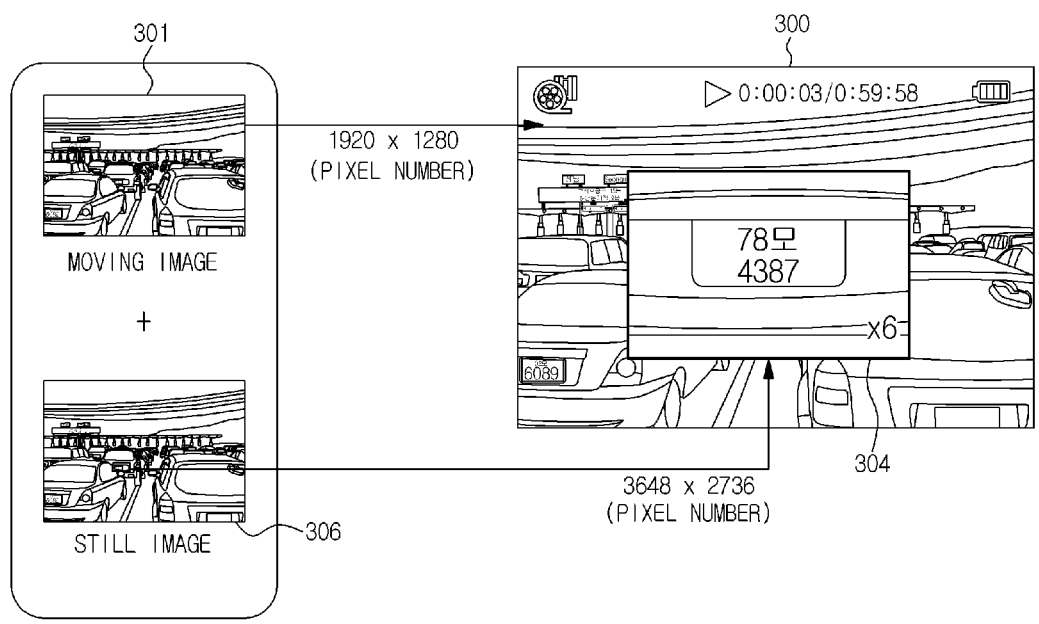

FIGS. 3A to 3C are views illustrating a process of magnifying a specific region of a moving image screen of the image photographing apparatus according to the embodiment of the present general inventive concept.

FIG. 3A shows a screen 300 in which a moving image is photographed in a simultaneous photographing mode. The first camera unit 110 photographs a moving image and the second camera unit 120 photographs a still image with a predetermined period (e.g. 1 second). The screen 300 may include the image of the moving image and any other data. For example, FIG. 3A illustrates a screen 300 that displays recording data such as recording time and battery life.

FIG. 3B shows a screen 300 in which a user 302 specifies a specific region 304 of the moving image screen while reproducing the moving image photographed in the simultaneous photographing mode. The user 302 may drag a cursor over the reproduced screen 300 in a diagonal direction so as to specify the specific region 304.

FIG. 3C shows a state in which the specific region 304 specified by the user 302 while reproducing the moving image photographed in the simultaneous photographing mode is magnified. The still image 306 photographed by the second camera unit 120 is magnified and displayed in the specific region specified by the user, and the moving image 301 photographed by the first camera unit 110 is continuously displayed in the region other than the specific region specified by the user. Accordingly, since the still image using a pixel region (e.g., 3648×2736) larger than a pixel region (e.g., 1920×1280) used by the moving image is magnified and displayed, the magnified specific region may have high resolution.

The term "simultaneous" as used in the specification and claims may include capturing images substantially at the same time. It may also include processes that run at the same time, even if images are captured at different times. For example, if an image-capture device is set to capture video and still images simultaneously, the device may include two cameras that each captures an image at the same time as the other. However, the device may also include a video camera that captures video and still images. If such a device is set to "simultaneous" mode, the camera may capture video images of a first dimension, then capture a still image corresponding to a selected portion of the video image smaller than the first dimension, then continue capturing video images of the first dimension. In such a case, the video and still images are being captured "simultaneously," inasmuch as they are captured by processes that are run simultaneously.

Figure 4A:
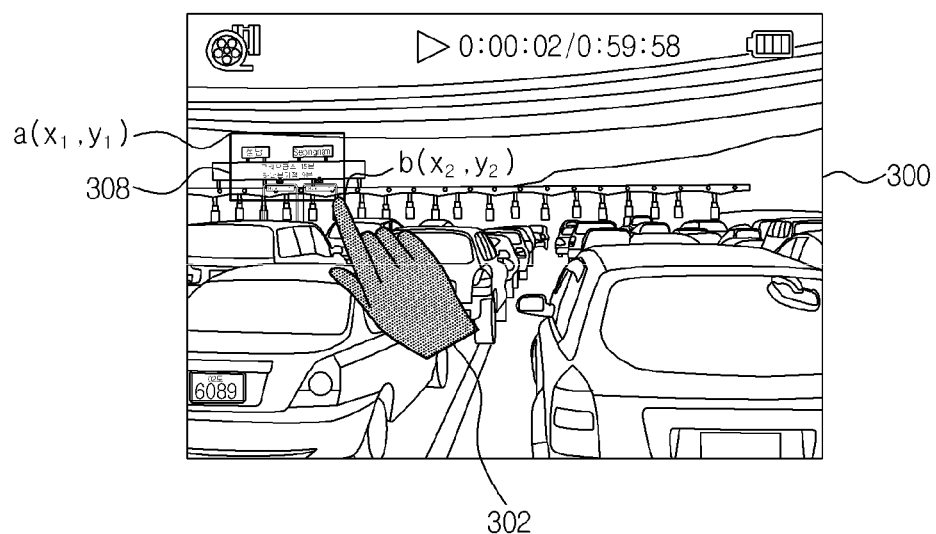
FIGS. 4A to 4C are views illustrating a process of magnifying a specific region of a moving image screen of the image photographing apparatus according to an embodiment of the present general inventive concept.
Figure 4B:
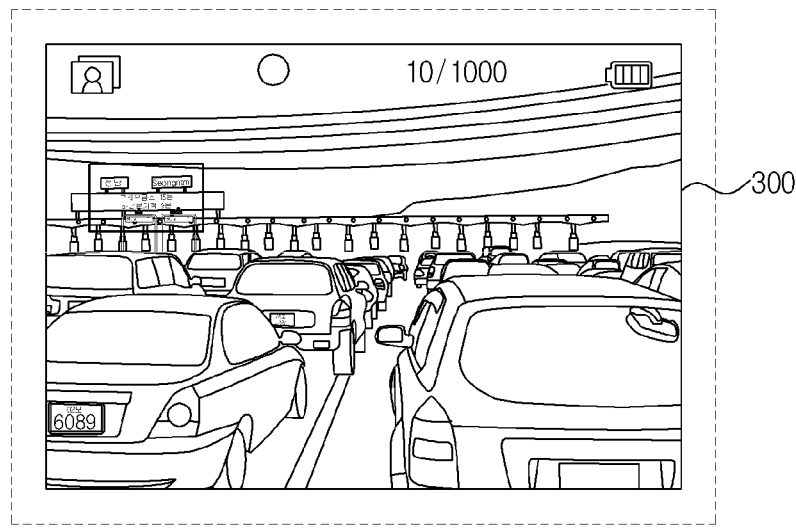
Figure 4C:
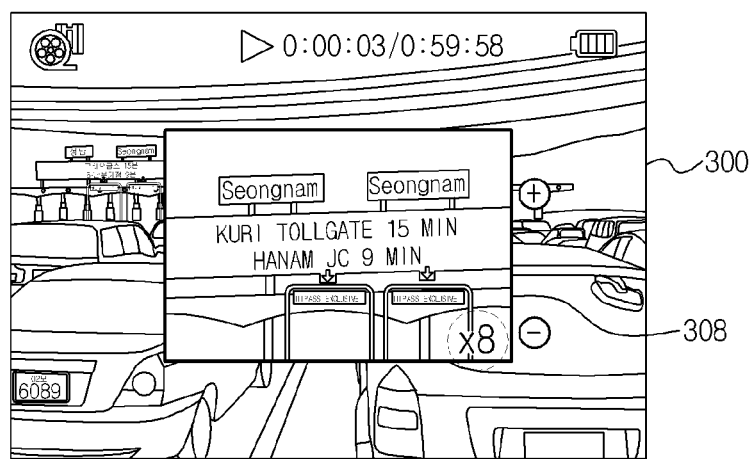

FIGS. 4A to 4C are views illustrating a process of magnifying a specific region of a moving image screen of the image photographing apparatus according to the embodiment of the present general inventive concept.

FIG. 4A shows a screen 300 in which a user 302 specifies a specific region 308 while reproducing a moving image photographed in a simultaneous photographing mode. The control unit 150 recognizes the coordinate (x1, y1) of a drag start point "a" and the coordinate (x2, y2) of a drag end point b when the user 302 drags a cursor over a portion of the moving image screen in a diagonal direction.

FIG. 4B shows an internal process which is invisible to the user. With respect to the coordinates (x1, y1) and (x2, y2) of the specific region specified by the user in FIG. 4A, the same coordinate region is recognized in the still image.

FIG. 4C shows a screen 300 in which the specific region 308 is specified and magnified by the user while reproducing the moving image photographed in the simultaneous photographing mode. The magnified specific region 308 is obtained by magnifying the specific region of the still image recognized in FIG. 4B.

Figure 5A:
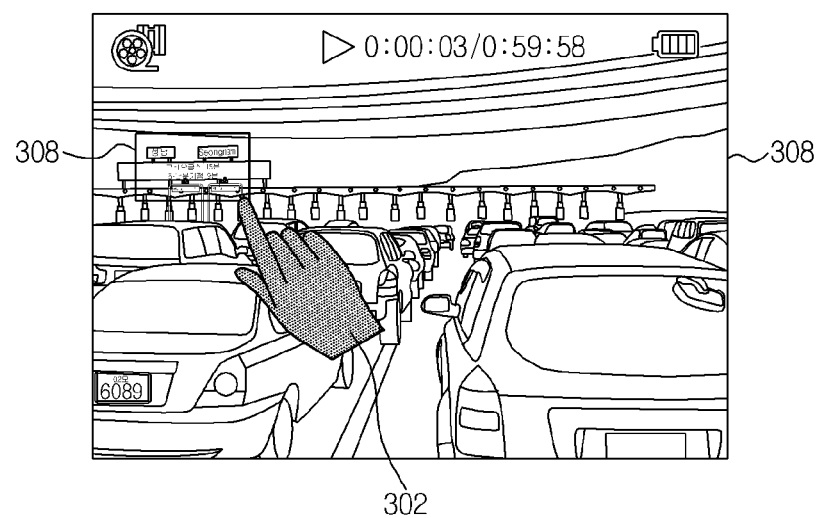
FIGS. 5A and 5B are views illustrating a process of magnifying a specific region of a moving image screen of the image photographing apparatus according to an embodiment of the present general inventive concept.
Figure 5B:
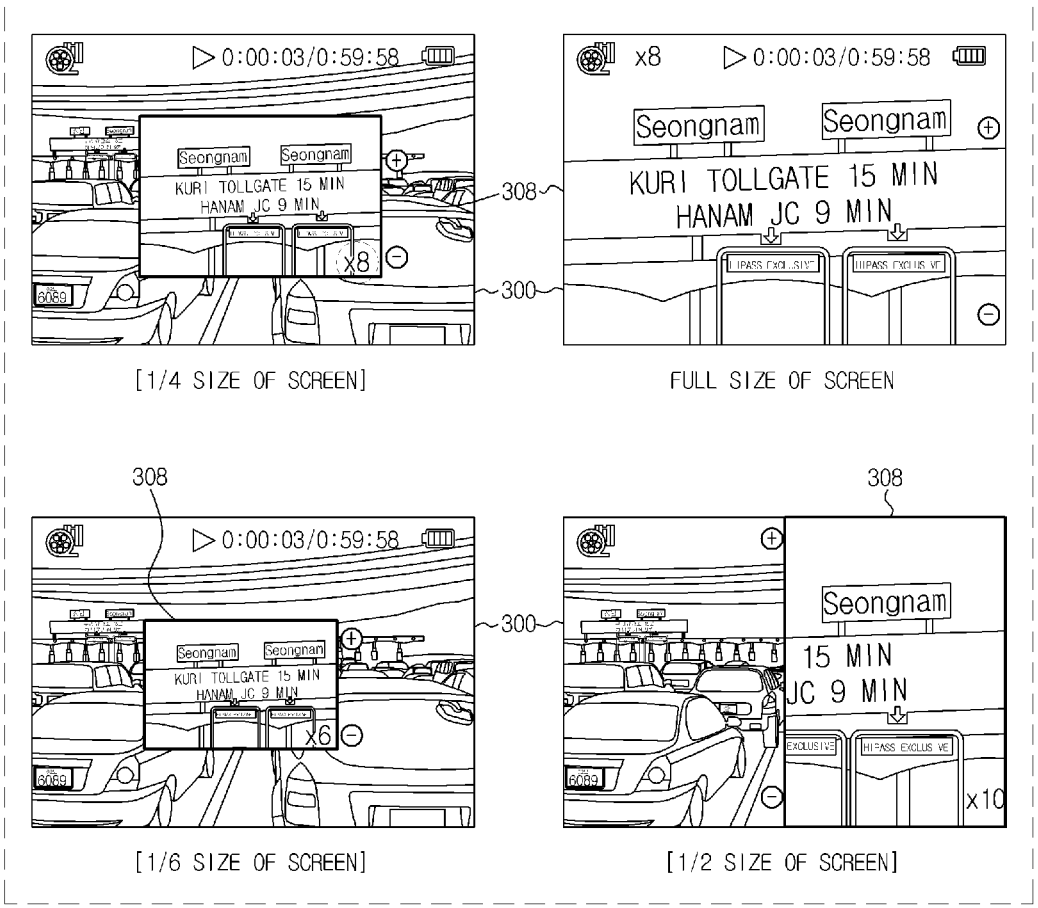

FIGS. 5A and 5B are views illustrating a process of magnifying a specific region of a moving image screen of the image photographing apparatus according to the embodiment of the present general inventive concept.

FIG. 5A shows a screen 300 in which a user 302 specifies a specific region 308 while reproducing a moving image photographed in a simultaneous photographing mode, and FIG. 5B shows a state in which the specific region is magnified and displayed with a plurality of selectable sizes. That is, a region having any one of a ⅛ size, a ¼ size, a ½ size and a full size of the moving image screen 300 may be selected by the manipulation of the user 302, and the embodiments of the present general inventive concept are not limited to the above sizes. The size of the specific region 308 may be adjusted.

Figure 6A:
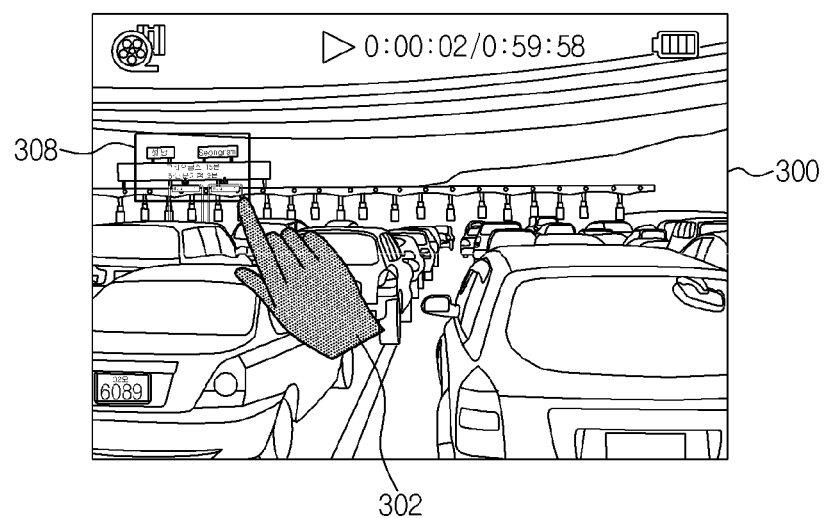
FIGS. 6A to 6C are views illustrating a process of magnifying and moving a specific region of a moving image screen of the image photographing apparatus according to the embodiment of the present general inventive concept.
Figure 6B:
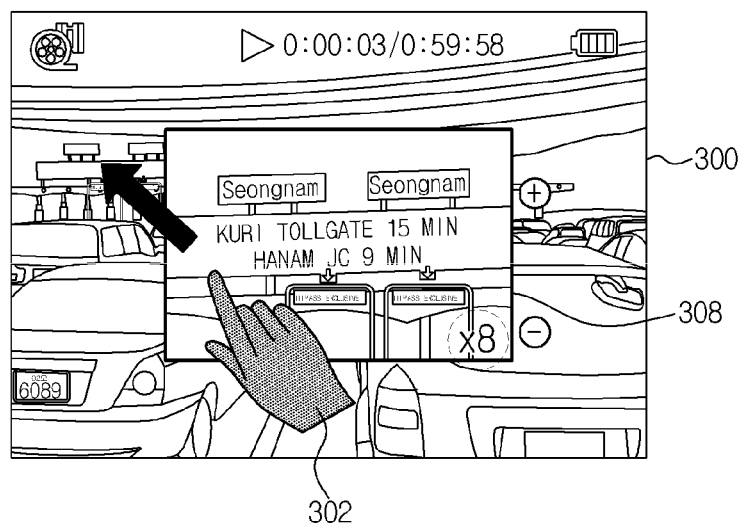
Figure 6C:
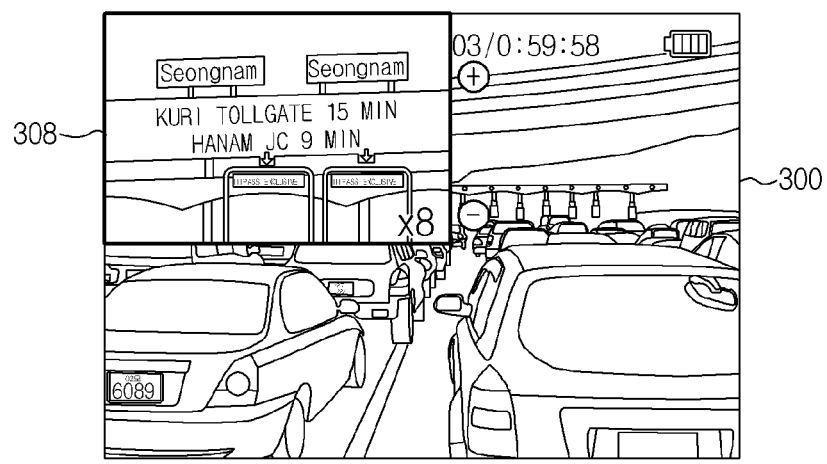

FIGS. 6A to 6C are views illustrating a process of magnifying and moving a specific region of a moving image screen of the image photographing apparatus according to the embodiment of the present general inventive concept.

FIG. 6A shows a screen 300 in which a user 302 specifies a specific region 308 while reproducing a moving image photographed in a simultaneous photographing mode, FIG. 6B shows a state in which the specific region 308 is magnified and displayed. When the user 302 drags the magnified specific region 308 in the direction denoted by the arrow, it can be seen that the magnified specific region 308 is moved as shown in FIG. 6C.

Figure 7:
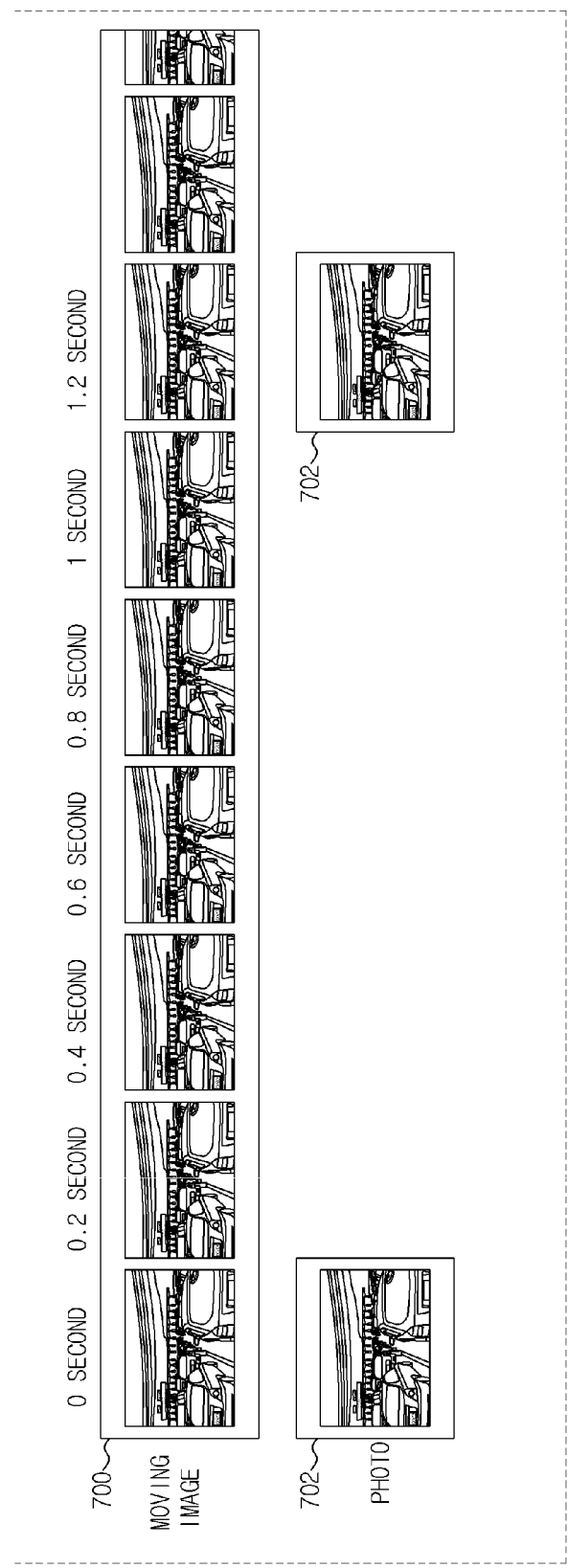
FIG. 7 is a view illustrating a photographing operation in a simultaneous photographing mode of the image photographing apparatus according to an embodiment of the present general inventive concept.

FIG. 7 is a view illustrating a photographing operation in a simultaneous photographing mode of the image photographing apparatus according to an embodiment of the present general inventive concept.

As shown in FIG. 7, the image photographing apparatus controls the first camera unit 110 so as to photograph a moving image 700 and controls the second camera unit 120 so as to photograph a still image 702 in a predetermined period, in a simultaneous photographing mode. The photographing period of the still image 702 may be manually adjusted. Since the photographing period of the still image 702 is set to 1.2 seconds in FIG. 3, the still image 702 is photographed every 1.2 seconds after starting the photographing of the moving image 700. At this time, the control unit 150 records a time when the still image 702 is photographed as tag information. That is, when the still image 702 is photographed while photographing the moving image 700, a mark is put on a portion of moving image 700 data streams corresponding to the time when the still image 702 is photographed, and thus time information is recorded. The mark may be a digital mark, such as one or more bits of data included with the video image data or data feed that may be processed to indicate to a computing device or to a user that a still image 702 was photographed at a certain point in the moving image 700.

The mark may include a visual and/or digital icon. For example, a dot, a box, a letter, or other icon may appear on a screen displaying the moving image 700 to indicate a location in the moving image 700 where the still image 702 was taken. When an icon is displayed, it may appear in frames of the moving image 700 before and after the still image 702 was taken, and it may be displayed brighter as the displayed frames approach the moving image frame corresponding to the time when the still image was taken. For example, if the mark is a visible dot on a screen, the dot may get brighter as the moving image is played and may be brightest at frames corresponding to the time that the still image was captured.

Figure 8:
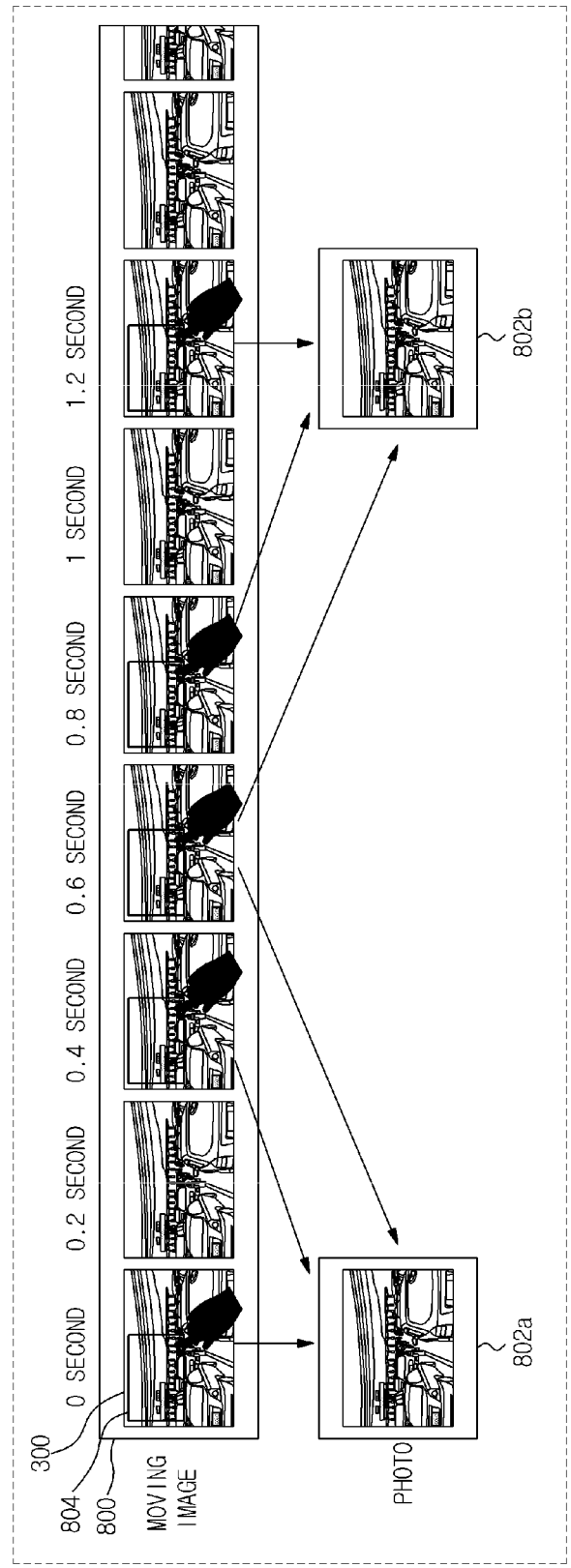
FIG. 8 is a view illustrating a method of selecting a still image when a specific region is specified during the output of a moving image, in the image photographing apparatus according to an embodiment of the present general inventive concept.

FIG. 8 is a view illustrating a method of selecting a still image when a specific region is specified during the reproduction of a moving image, in the image photographing apparatus according to the embodiment of the present general inventive concept.

As shown in FIG. 8, when a user 302 specifies a specific region 804 of a moving image screen 300 while reproducing a moving image 800 photographed in a simultaneous photographing mode, a still image 802 photographed at a time point closest to a photographing time point of the moving image 800 reproduced at a time point when the specific region 804 is specified is magnified and displayed. For example, when the specific region 804 of the moving image screen 300 reproduced at moving image photographing start time point "0 second" is specified, a still image 802a photographed at a time point closest to the photographing time point of the moving image 800 reproduced at the time point when the specific region is specified is selected, and the region corresponding to the specific region 804 in the selected still image 802a is magnified and displayed. In addition, when the user specifies the specific region 804 of the moving image screen 300 reproduced after "0.6 seconds" from the start of the photographing of the moving image 800, there are still images 802a and 802b with the same time difference ("0.6 seconds") before and after the time point ("0.6 seconds") when the specific region 804 is specified. In such a circumstance, either one of the still images 802a or 802b may be randomly selected to be magnified and displayed, or one of the still images 802a, 802b may be selected according to a predetermined pattern (e.g., a still image which is previously photographed) may be magnified and displayed.

FIG. 9 is a view illustrating a process of magnifying and capturing a specific region of a moving image screen of the image photographing apparatus according to the embodiment of the present general inventive concept.

As shown in FIG. 9, when a user specifies a specific region 308 of a moving image screen 300 while reproducing a moving image photographed in a simultaneous photographing mode, a still image photographed at a time point closest to a photographing time point of the moving image reproduced at a time point when the specific region is specified is magnified and displayed. When the key input unit 106 is operated or a capture button displayed on the display unit 140 is clicked, the displayed region may be captured.

Figure 10A:
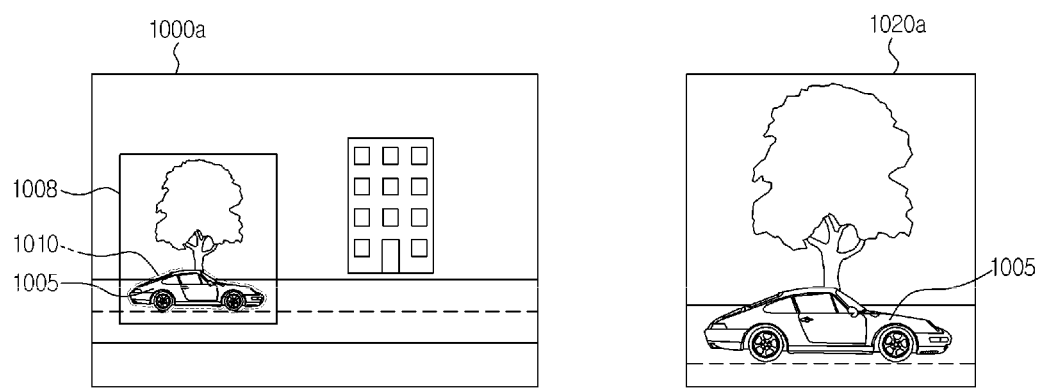
FIGS. 10A-10C illustrate setting parameters to take still images according to an embodiment of the present general inventive concept.
Figure 10B:
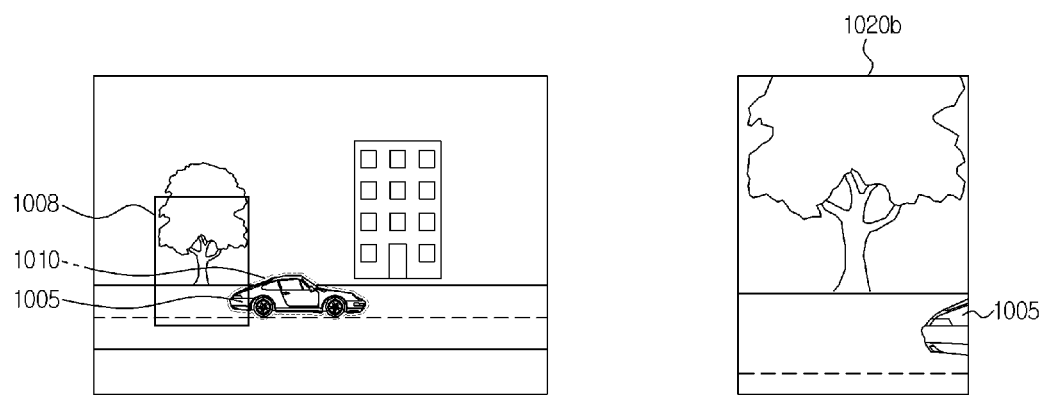
Figure 10C:
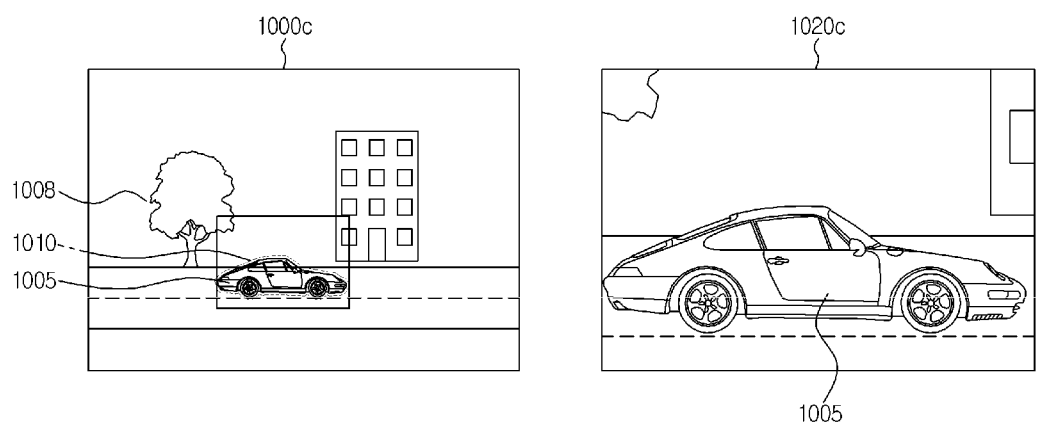

FIGS. 10A-10C illustrate identifying an object in the specific region, according to an embodiment of the present general inventive concept.

In FIG. 10A, a screen 1000a displays a frame from a video image. A user selects a specific portion of the video image 1008 to take a still picture 1020a. An image-capture apparatus may analyze the selected portion 1008 to identify an object within the selected portion 1008. For example, the image-capture apparatus may be programmed to search for an object having a size, shape, or mass of an automobile. In such a case, the image-capture apparatus would analyze the selected portion 1008 and identify the automobile 1005. The image-capture apparatus may then be controlled to perform a function based on the presence of the object.

For example, as illustrated in FIGS. 10B and 10C, the image-capture apparatus may be controlled to follow an automobile with the still camera while maintaining the video camera stationary. In FIG. 10B, the automobile 1005 moves across the screen 1000b in a subsequent frame of the video image, and the image-capture apparatus follows the shape of the automobile 1010 across the video image 1000b. Still image 1020b represents an image of a selected portion 1008 of the video image that would be taken if the image-capture device did not follow the automobile 1005.

In FIG. 10C, the image capture apparatus controls the selected portion 1008 to follow the shape 1010 of the automobile 1005. Still image 1020c illustrates a still image of the image-capture apparatus that follows the shape 1010 of the automobile 1005.

Similarly, the image-capture apparatus may be controlled to increase a size of the selected area to include an object, to take still pictures only when the object is present in the selected area, to take still pictures any time an object of a predetermined characteristic is within the selected area, to display the still images only when an object having the predetermined characteristic is within the selected portion of the video image, or to perform any other function with respect to the still images.

The identifying characteristic may include a shape, size, mass, speed, or any other characteristic, such as a facial identification characteristic.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

For example, referring to FIG. 2B, the image-capture apparatus 200 may receive a computer-readable medium, such as a disk or FLASH drive via the I/O unit 260, or may receive code from a computer-transmission medium, such as a computer having a wireless transmitter. The control unit 250 may execute code stored in the computer-readable medium to control the function units of the image-capture apparatus to perform the above-described functions, such as simultaneous video and image capture.

FIG. 10 is a flowchart illustrating a method of controlling an image photographing apparatus according to an embodiment of the present general inventive concept.

As shown in FIGS. 10A-10C, when a screen photographed in a simultaneous photographing mode of the image photographing apparatus is reproduced in operation S10, it is determined whether a user specifies a specific region in operation S20. The user may drag a portion of a moving image screen so as to specify the specific region, while reproducing a moving image photographed in the simultaneous photographing mode.

Next, if it is determined that the user has specified the specific region of the moving image screen while reproducing the moving image photographed in the simultaneous photographing mode, the coordinates of the specific region are recognized in operation S30. When the user drags a portion of the moving image reproduction screen in a diagonal direction, the control unit 150 recognizes the coordinates (x1, y1) of a drag start point and the coordinates (x2, y2) of a drag end point.

Next, the control unit 150 recognizes a still image photographed at a time point closest to a photographing time point of the moving image reproduced at a time point when the user specifies the specific region and recognizes a region corresponding to the coordinate of the specific region in the recognized still image in operation S40. At this time, if still images are photographed with the same time difference before and after the photographing time point of the moving image reproduced at the time point when the specific region is specified, a still image randomly selected from the still images is recognized or a still image selected according to a predetermined pattern (e.g., an image which is previously photographed) is recognized, and a region corresponding to the coordinates of the specific region in the recognized still image is recognized.

Next, if the still image, photographed at a time point closest to the photographing time point of the moving image reproduced when the user specifies the specific region is recognized and the region corresponding to the coordinates of the specific region in the recognized still image, is recognized in operation S40, the control unit 150 magnifies and displays the region corresponding to the coordinate of the specific region of the recognized still image (operation S50).

Next, it is determined whether there is a moving image reproduction end command. If there is no reproduction end command, the screen photographed in the simultaneous photographing mode is continuously reproduced. At this time, the magnified specific region on the moving image screen may be set to be continuously changed according to the change of the moving image or to be stopped in the magnified state (operation S60).

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of controlling an image photographing apparatus to photograph a still image while photographing a moving image, the method comprising:
    determining whether a specific region of a moving image screen is specified;
    searching for a still image of the specific region; and
    in response to the specific region of the moving image screen being specified, displaying the still image on at least a portion of the moving image while the moving image continues to be photographed in real time and while the moving image continues to be displayed on the moving image screen such that the still image is magnified and the continuously photographed moving image is not magnified when the specific region is specified.

2. The method according to claim 1, wherein the photographing of the still image while photographing the moving image includes periodically photographing the still image while photographing the moving image.

3. The method according to claim 2, wherein the photographing period of the still image while photographing the moving image is manually adjusted.

4. The method according to claim 2, wherein a time when the still image is photographed while photographing the moving image is recorded as tag information.

5. The method according to claim 2, wherein, when the still image is photographed while photographing the moving image, a mark is put on a portion of moving image data streams corresponding to a time when the still image is photographed, such that time information is recorded.

6. The method according to claim 2, wherein the displayed still image is continuously changed to still images of the specific region photographed thereafter.

7. The method according to claim 1, wherein the specific region of the moving image screen is specified by dragging a cursor over the specific region.

8. The method according to claim 7, wherein the coordinate of a drag start point and the coordinate of a drag end point are recognized on the moving image screen so as to recognize the coordinate region of the specific region.

9. The method according to claim 1, wherein the searching of the still image of the specific region includes searching for the still image photographed at a time point closest to a photographing time point of the moving image reproduced at a time point when the specific region is specified.

10. The method according to claim 9, wherein, if two still images exist that have been photographed at a same period of time before and after the time point when the specific region is specified, a still image of the two still images is selected by a predetermined pattern.

11. The method according to claim 9, wherein, if two still images exist that have been photographed at a same period of time before and after the time point when the specific region is specified, respectively, a still image of the two still images is randomly selected.

12. The method according to claim 1, wherein the searching of the still image of the specific region includes recognizing the coordinate region of the specific region in the moving image screen and searching for the coordinate region in the still image corresponding to the recognized coordinate region.

13. The method according to claim 1, wherein the displaying of the searched still image includes magnifying and displaying the still image of the specific region with a ratio inversely proportional to the size of the specific region on the moving image screen.

14. The method according to claim 1, wherein the displaying of the searched still image includes magnifying and displaying the still image of the specific region with any one of a plurality of selectable sizes.

15. The method according to claim 1, wherein, when the searched still image is displayed, the displayed still image is dragged to be moved.

16. The method according to claim 1, wherein, when the searched still image is displayed, a key input unit or a display panel is operated such that the displayed still image is captured.

17. An image photographing apparatus to photograph a still image while photographing a moving image, the apparatus comprising:

a photographing unit to photograph a moving image and a still image;

a display unit to display the moving image; and a control unit to search for a still image of a specific region and in response to the still image of the specific region being searched, to display the still image on at least a portion of the moving image while the moving image continues to be photographed in real time to be displayed on the display unit such that the still image is magnified and the continuously photographed moving image is not magnified when the specific region of a moving image screen is specified.

18. The image photographing apparatus according to claim 17, wherein the photographing unit further comprises a first camera unit to photograph the moving image and a second camera unit to photograph the still image.

19. The image photographing apparatus according to claim 18, wherein the first camera unit includes a first lens to capture an external image, a first image sensor to convert the moving image input through the first lens into an electrical signal, and a first driver to drive the first image sensor.

20. The image photographing apparatus according to claim 18, wherein the second camera unit includes a second lens to capture an external image, a second image sensor to convert the still image input through the second lens into an electrical signal, and a second driver to drive the second image sensor.

21. The image photographing apparatus according to claim 17, further comprising a mode selection switch to select any one from a moving image photographing mode to photograph the moving image, a still image photographing mode to photograph the still image and a simultaneous photographing mode to photograph both the moving image and the still image.

22. The image photographing apparatus according to claim 17, wherein the control unit checks the photographing mode of the image photographing apparatus and periodically photographs the still image while photographing the moving image if the photographing mode is the simultaneous photographing mode.

23. The image photographing apparatus according to claim 22, wherein a time when the still image is photographed while photographing the moving image is recorded as tag information.

24. The image photographing apparatus according to claim 22, wherein the control unit puts a mark on a portion of moving image data streams corresponding to a time when the still image is photographed while photographing the moving image, such that time information is recorded.

25. The image photographing apparatus according to claim 22, wherein the control unit controls the display unit to continuously display the still image photographed periodically.

26. The image photographing apparatus according to claim 17, wherein the control unit searches for a still image photographed at a time point closest to a photographing time point of the moving image reproduced at a time point when the specific region is specified.

27. The image photographing apparatus according to claim 26, wherein, if two still images exist having been taken a same period of time before and after the time point when the specific region is specified, respectively, the control unit selects a still image of the two still images by a predetermined pattern.

28. The image photographing apparatus according to claim 26, wherein, if two still images exist having been taken a same period of time before and after the time point when the specific region is specified, respectively, the control unit randomly selects one of the two still images.

29. The image photographing apparatus according to claim 17, wherein the control unit recognizes the coordinate region of the specific region in the moving image screen and searches for the coordinate region in the still image corresponding to the recognized coordinate region.

30. A method of capturing a still image and a video image, the method comprising:
continuously displaying a video image;
sensing a selected portion of the video image;
capturing a still image of the selected portion; and
in response to the still image of the selected portion of the video image being captured, displaying the still image on at least a portion of the video image while the video image continues to be photographed in real time such that the still image is magnified and the continuously photographed video image is not magnified.

31. A method of capturing a still image and a video image, the method comprising:
receiving a user input selecting a portion of a video image;
capturing a still image corresponding to the selected portion of the video image; and
in response to the still image corresponding to the selected portion of the video image being captured, displaying the still image on at least a portion of the video image while the video image continues to be photographed in real time such that the still image is magnified and the continuously photographed video image is not magnified.

32. A method of capturing a still image and a video image, the method comprising:
capturing a video image;
receiving an input to capture a still image of a selected portion of the video image;
capturing a still image of the selected portion of the video image; and
in response to the still image of the selected portion of the video image being captured, displaying the still image on at least a portion of the video image while the video image continues to be photographed in real time such that the still image is magnified and the continuously photographed video image is not magnified.

33. The method according to claim 32, further comprising: recognizing a selected object in the selected portion of the video image.

34. The method according to claim 33, further comprising: when the selected object moves from the selected portion of the video image, adjusting at least one of a size and a location of the selected portion to include the selected object.

35. The method according to claim 33, wherein recognizing the selected object includes recognizing at least one of a size, shape, profile, mass, and type of the selected object.

36. The method according to claim 32, wherein receiving an input comprises:
sensing a user input to select a first point on a screen displaying the video image; and
sensing a user input to drag a selection icon from the first point to a second point on the screen to define the selected portion.

37. The method according to claim 32, wherein capturing the still image comprises:
capturing still images at regular intervals of time.

38. The method according to claim 32, wherein the still image is captured with a higher resolution than the video image.

39. The method according to claim 32, further comprising: displaying the still image on a display.

40. The method according to claim 32, wherein the still image is also displayed on a different screen from the video image.

41. The method according to claim 39, wherein the still image is displayed on a same screen as the video image.

42. The method according to claim 41, wherein the still image is displayed on only a portion of the screen so as to continue displaying the video image on the screen.

43. The method according to claim 39, wherein the still image is displayed for only a predetermined period of time.

44. The method according to claim 39, wherein the still image is magnified on the display.

45. The method according to claim 32, further comprising:
marking data corresponding to the captured video image when the still image is captured.

46. The method according to claim 45, wherein marking the data includes generating a visual object on the video image at a point in the data feed where the still image is captured.

47. The method according to claim 32, wherein the still image is captured simultaneously with the capture of the video image.

48. A method of a still image and a video image, the method comprising:
capturing a video image;
regularly capturing still images corresponding to a selected portion of the video image;
sensing an input to display one of the still images; and
in response to the input, displaying one of the still images on at least a portion of the video image while the video image continues to be photographed in real time such that the still image is magnified and the continuously photographed video image is not magnified.

49. The method according to claim 48, wherein displaying one of the still images comprises:
determining whether a captured still image exists that is captured at a time closest to a time that the input was sensed; and
if it is determined that a captured still image exists that was captured at a time closest to a time that the input was sensed, displaying the captured still image.

50. The method according to claim 49, wherein, if it is determined that two still images exist that were captured at times equidistant from the time that the input was sensed, displaying one of the two still images.

51. The method according to claim 50, wherein displaying one of the two still images comprises:
selecting at random one of the two still images to display.

52. An image-capture apparatus, comprising:
an image-capture unit to capture a video image and a still image;
a controller to cause the image-capture unit to capture the still image corresponding to a selected portion of the video image; and
a display to display, in response to the still image of the selected portion of the video image being captured, the still image on at least a portion of the video image while the video image continues to be photographed in real time such that the still image is magnified and the continuously photographed video image is not magnified.

53. The image-capture apparatus according to claim 52, wherein each of the video image and the still image are displayed on the display.

54. The image-capture apparatus according to claim 52, wherein the display comprises at least a first display to display the video image and a second display to display the still image.

55. The image-capture apparatus according to claim 52, further comprising:

an input unit to receive an input to select the selected portion of the video image.

56. The image-capture apparatus according to claim 55, wherein the input unit is a display to display the video image.

57. The image-capture apparatus according to claim 55, wherein the input unit comprises at least one of a button, a knob, a dial, and a touch-pad, and a touch screen.

58. The image-capture apparatus according to claim 56, wherein each of the video image and the still image are displayed on the display.

59. The image-capture apparatus according to claim 52, wherein the image-capture unit comprises:

a first camera to capture the video image; and
a second camera to capture the still image.

60. The image-capture apparatus according to claim 59, wherein the second camera has a higher resolution than the first camera.

61. The image-capture apparatus according to claim 52, further comprising:

a data storage unit to store at least one of the video image and the still image.

62. The image-capture apparatus according to claim 61, wherein the controller determines a first time at which the portion of the video image is selected and displays a stored still image corresponding to a time closest to the first time.

63. The image-capture apparatus according to claim 52, wherein the controller causes the image-capture unit to capture the still image simultaneously with the capture of the video image.

64. A non-transitory computer-readable medium having stored thereon executable code to execute a method, the method comprising:

capturing a video image;
receiving an input to capture a still image of a selected portion of the video image;
capturing a still image of the selected portion of the video image; and
in response to the still image of the selected portion of the video image being captured, displaying the still image on at least a portion of the video image while the video image continues to be photographed in real time such that the still image is magnified and the continuously photographed video image is not magnified.

\* \* \* \* \*